(12) United States Patent
Kobayashi et al.

(10) Patent No.: US 10,778,594 B2
(45) Date of Patent: Sep. 15, 2020

(54) TRANSFER CONTROL DEVICE, TRANSFER CONTROL METHOD, AND COMPUTER PROGRAM PRODUCT

(71) Applicant: Kabushiki Kaisha Toshiba, Minato-ku (JP)

(72) Inventors: Yuta Kobayashi, Ota (JP); Yasin Oge, Sagamihara (JP); Takahiro Yamaura, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 16/117,381

(22) Filed: Aug. 30, 2018

(65) Prior Publication Data

US 2019/0297025 A1    Sep. 26, 2019

(30) Foreign Application Priority Data

Mar. 20, 2018  (JP) .................................. 2018-052532

(51) Int. Cl.
*H04L 12/863* (2013.01)
*H04L 12/927* (2013.01)
(Continued)

(52) U.S. Cl.
CPC ............ *H04L 47/50* (2013.01); *B60R 16/023* (2013.01); *H04L 12/40013* (2013.01); *H04L 12/4015* (2013.01); *H04L 47/24* (2013.01); *H04L 47/28* (2013.01); *H04L 47/29* (2013.01); *H04L 47/30* (2013.01); *H04L 47/32* (2013.01);
(Continued)

(58) Field of Classification Search
CPC ..... H04L 47/50; H04L 47/822; H04L 47/821; H04L 47/805; H04L 47/56; H04L 47/568; H04L 47/28; H04L 47/29; H04L 47/30; H04L 47/32; H04L 47/6215; H04L 47/6255; H04L 47/24; H04L 47/801; H04L 47/741; H04L 47/722; H04L 47/826; H04L 47/78; H04L 12/4015; H04L 12/40013; H04L 2012/40273; B60R 16/023
See application file for complete search history.

(56) References Cited

U.S. PATENT DOCUMENTS 6,532,213 B1 * 3/2003 Chiussi .................. H04L 47/22
370/230.1
9,893,992 B2    2/2018 Hiramoto et al.
(Continued)

FOREIGN PATENT DOCUMENTS

JP    2013-066062 A    4/2013
JP    2016-082363    5/2016

*Primary Examiner* — Joshua Kading
(74) *Attorney, Agent, or Firm* — Oblon, McClelland, Maier & Neustadt, L.L.P.

(57) ABSTRACT

According to an embodiment, a transfer control device controls transfer of data stored in a communication device. The transfer control device includes a memory and one or more hardware processors electrically coupled to the memory and configured to function as a control unit, and a determining unit. The control unit performs control for transferring the data to a first transmission buffer. The determining unit determines, depending on a state of the communication device, data to be restricted from being transferred. When transfer is to be restricted, the control unit delays transfer of data to be restricted from being transferred.

8 Claims, 14 Drawing Sheets

(51) Int. Cl.
   *H04L 12/801*     (2013.01)
   *H04L 12/875*     (2013.01)
   *H04L 12/925*     (2013.01)
   *H04L 12/851*     (2013.01)
   *H04L 12/835*     (2013.01)
   *H04L 12/911*     (2013.01)
   *H04L 12/823*     (2013.01)
   *H04L 12/841*     (2013.01)
   *H04L 12/40*      (2006.01)
   *B60R 16/023*     (2006.01)

(52) U.S. Cl.
   CPC ............ *H04L 47/56* (2013.01); *H04L 47/568* (2013.01); *H04L 47/6215* (2013.01); *H04L 47/6255* (2013.01); *H04L 47/722* (2013.01); *H04L 47/741* (2013.01); *H04L 47/801* (2013.01); *H04L 47/805* (2013.01); *H04L 47/821* (2013.01); *H04L 47/822* (2013.01); *H04L 47/78* (2013.01); *H04L 47/826* (2013.01); *H04L 2012/40273* (2013.01)

(56) References Cited

U.S. PATENT DOCUMENTS

| | | |
|---|---|---|
| 2008/0008203 A1 | 1/2008 | Frankkila et al. |
| 2013/0185417 A1* | 7/2013 | Yunoki .............. H04L 47/6215 709/224 |
| 2019/0007344 A1* | 1/2019 | Mangin ................ H04L 49/351 |
| 2019/0081903 A1 | 3/2019 | Kobayashi et al. |

* cited by examiner

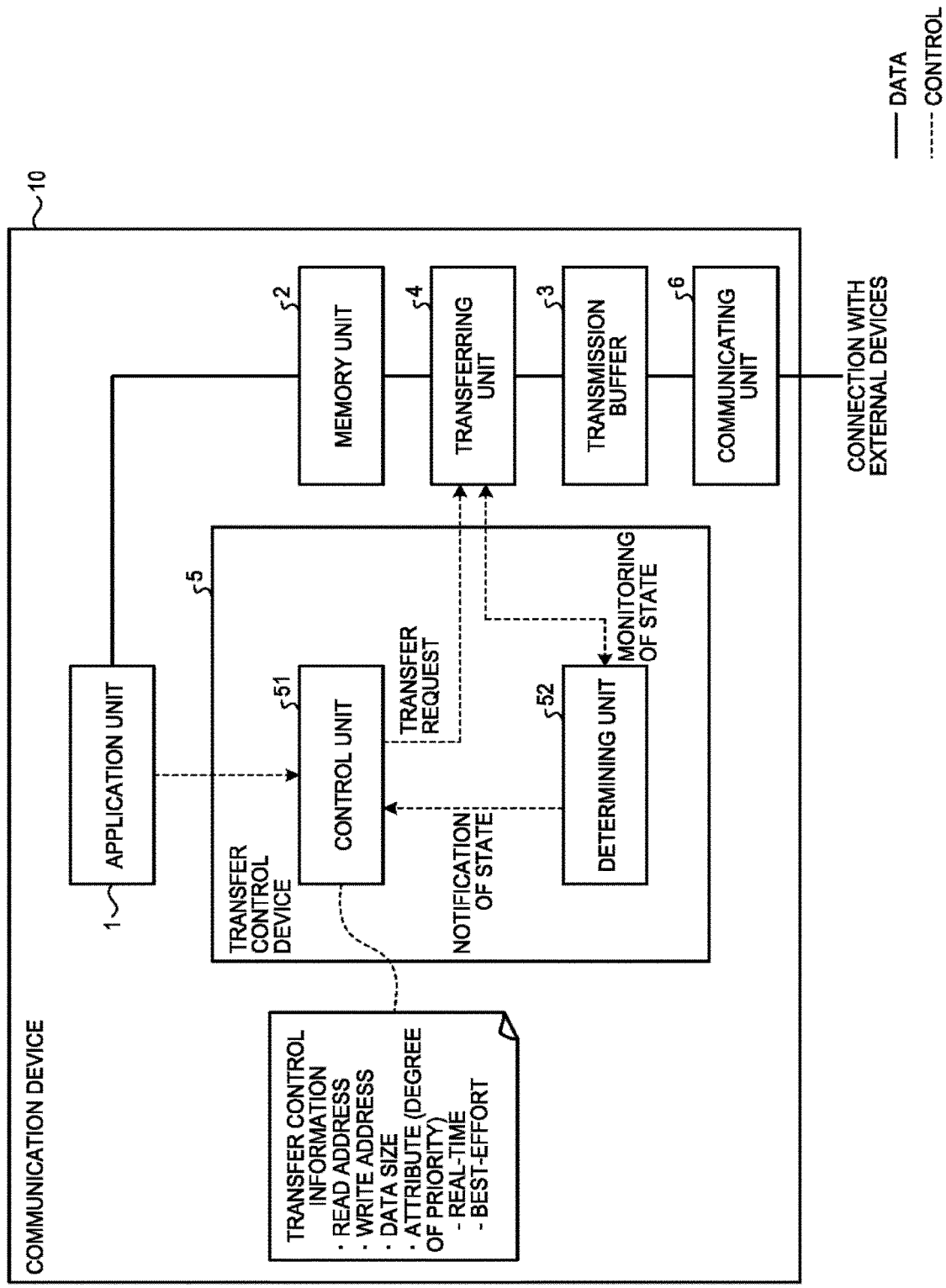

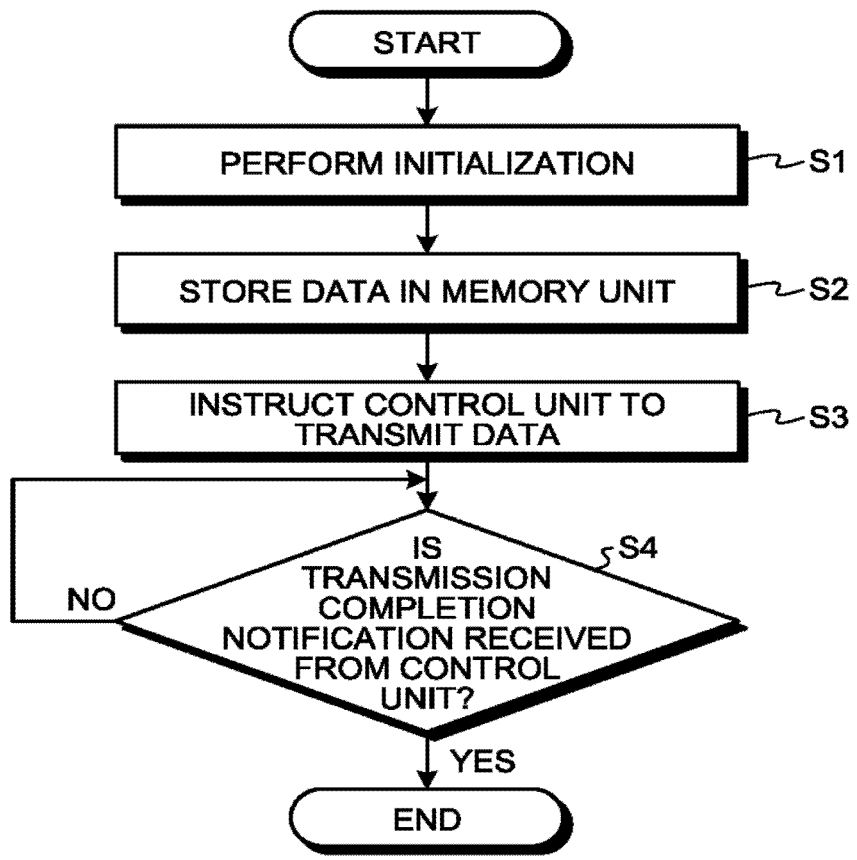
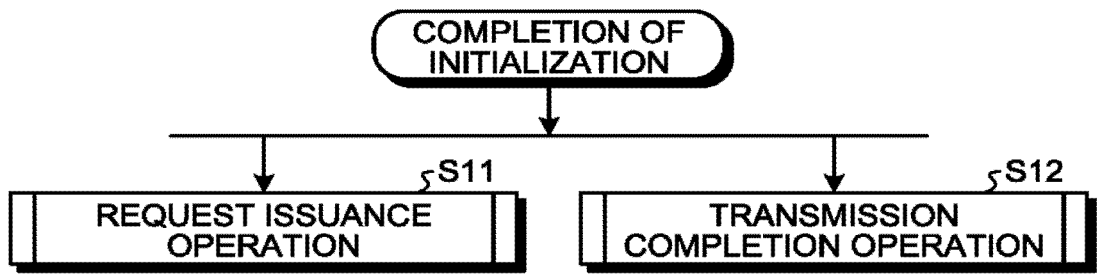

TRANSFER CONTROL DEVICE, TRANSFER CONTROL METHOD, AND COMPUTER PROGRAM PRODUCT

CROSS-REFERENCE TO RELATED APPLICATIONS

This application is based upon and claims the benefit of priority from Japanese Patent Application No. 2018-052532, filed on Mar. 20, 2018; the entire contents of which are incorporated herein by reference.

FIELD

Embodiments described herein relate generally to a transfer control device, a transfer control method, and a computer program product.

BACKGROUND

In the field of an industrial network in a factory, and in the field of an in-vehicle network in a vehicle; a high degree of real-time capability is required. In recent years, in an industrial network or an in-vehicle network, the use of communication standards such as Ethernet (registered trademark) is becoming popular, and various real-time Ethernet standards have been proposed.

However, in the conventional technology, it is not possible to control the transfer of data to a communicating unit while taking into account the timings of data transmission from the communicating unit.

BRIEF DESCRIPTION OF THE DRAWINGS

FIG. 1 is a diagram illustrating an exemplary functional configuration of a communication device according to a first embodiment;

FIG. 2 is a flowchart for explaining an example of the operations performed by an application unit according to the first embodiment;

FIG. 3 is a diagram illustrating an example of the operations performed by a control unit according to the first embodiment;

DETAILED DESCRIPTION

Figure 4:
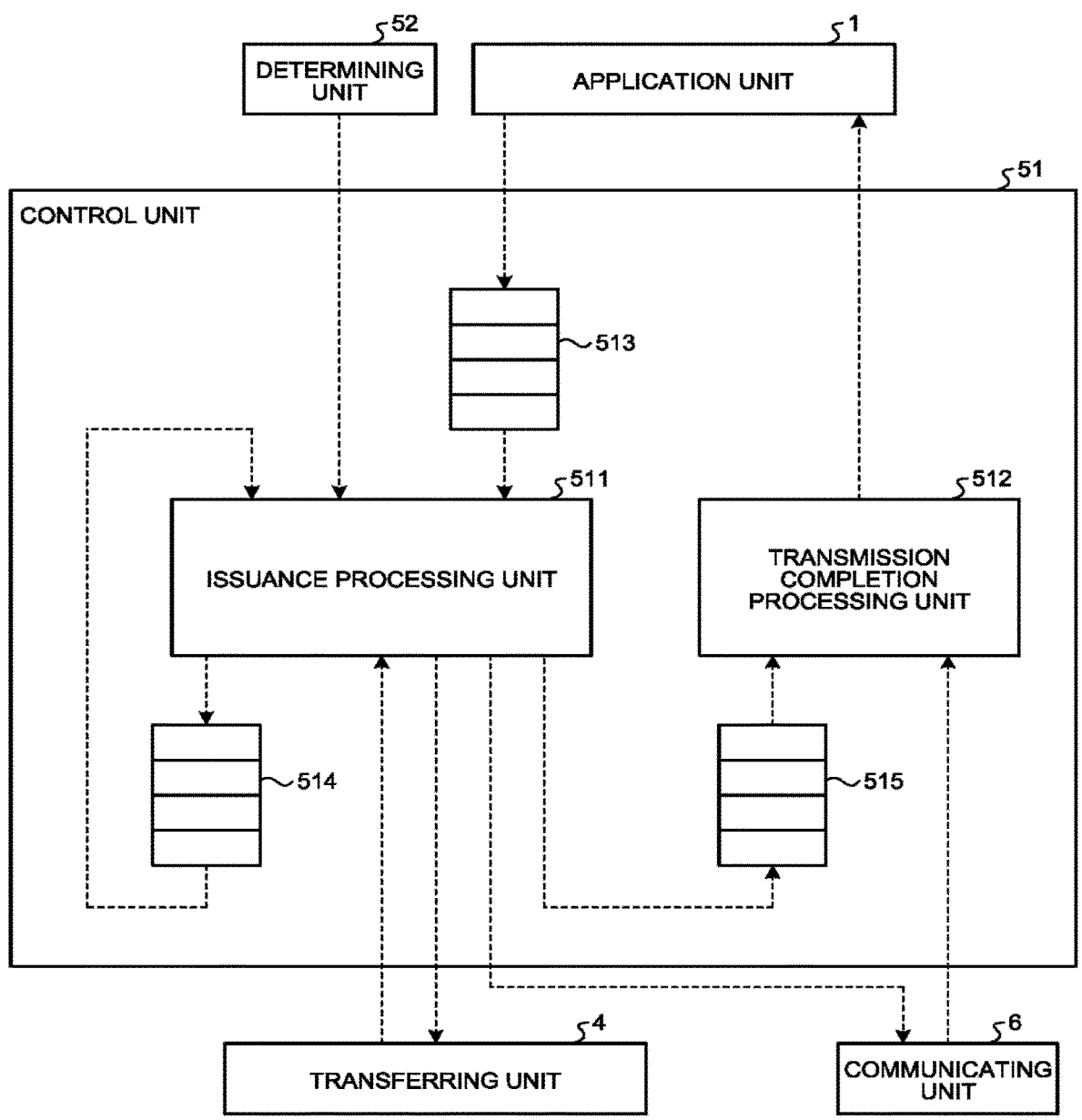
FIG. 4 is a diagram illustrating an exemplary functional configuration of the control unit according to the first embodiment.

According to an embodiment, a transfer control device controls transfer of data stored in a communication device. The transfer control device includes a memory and one or more hardware processors electrically coupled to the memory and configured to function as a control unit, and a determining unit. The control unit performs control for transferring the data to a first transmission buffer. The determining unit determines, depending on a state of the communication device, data to be restricted from being transferred. When transfer is to be restricted, the control unit delays transfer of data to be restricted from being transferred.

Exemplary embodiments of a transfer control device, a transfer control method, and a computer program product are described below in detail with reference to the accompanying drawings.

First Embodiment

Firstly, the explanation is given about an example of the standard used in the field of industrial networks and the field of in-vehicle networks in which a high degree of real-time capability is required.

For example, as the standard for achieving real-time capability using Ethernet (registered trademark), standardization of time-sensitive networking (TSN) is underway in the IEEE 802.1 TSN Task group. The TSN is configured using a plurality of standards. Moreover, the TSN is the extended standard of audio/video bridging (AVB) that enables achieving low latency and that is used in professional audio. In order to make the TSN applicable also in industrial networks and in-vehicle networks, the TSN is aimed to have a higher degree of real-time capability than the AVB and to have a high degree of reliability.

The TSN standards include the IEEE 802.1Qbv standard in which a plurality of transmission buffers (in the IEEE 802.1Qbv standard, transmission queues) having different degrees of priority is controlled according to scheduling information (a gate control list) that is set in advance, so that the transmission timings of data (frames) can be rigidly controlled for each degree of priority. In each transmission buffer, a gate is set for allowing transmission of data. When the gate is open, the data transmission is allowed. However, when the gate is closed, the data transmission is prohibited.

In the gate control list, the state of each gate for a single cycle is stored. A network interface card (NIC) that is compatible to the IEEE 802.1Qbv standard refers to the current timing, the gate control list, and the start timing of gate control; selects the transmission buffer having the degree of priority for which transmission is currently possible; and performs a transmission operation for transmitting data. In this way, as a result of rigidly controlling the transmission timings of data according to the gate control list, it becomes possible to avoid collision of transmission timings of data having different degrees of priority, and to reduce the fluctuation in the transmission delay period and the transmission period.

Meanwhile, the transmission control according to the IEEE 802.1Qbv standard is performed with respect to Ethernet frames that have already been input to the transmission buffers used in the NIC. Moreover, network stacks and applications that are responsible for the protocol processing of higher levels than the media access control (MAC) are processed independent of the transmission control according to the IEEE 802.1Qbv standard. That is, the direct memory access (DMA) processing, which is performed for transferring data from the main memory to the transmission buffers used by the NIC, is performed in an asynchronous manner with respect to the timings of transmission control according to the IEEE 802.1Qbv standard. For that reason, when there is congestion of accesses to the memory and the bus, the DMA processing of the data having a low degree of priority may affect the DMA processing of the data having a high degree of priority. If the DMA processing of the data having a low degree of priority occupies the memory and the bus; then, for example, regardless of the fact that the preparation of the data having a high degree of priority is already completed in an application or a higher-level network stack, there arises a problem that the data cannot be input to the transmission buffers till the timing of opening of the gate.

Given below is the explanation of an exemplary functional configuration of a communication device according to the embodiments.

Example of Functional Configuration

FIG. 1 is a diagram illustrating an exemplary functional configuration of a communication device 10 according to a first embodiment. The communication device 10 according to the first embodiment is, for example, a device for transmitting data to external devices. More particularly, examples of the communication device 10 according to the first embodiment include a personal computer, a server device, a dedicated large-scale integration (LSI) circuit, and a field programmable gate array (FPGA).

The communication device 10 according to the first embodiment includes an application unit 1, a memory unit 2, a transmission buffer 3, a transferring unit 4, a transfer control device 5, and a communicating unit 6. The transfer control device 5 further includes a control unit 51 and a determining unit 52.

The application unit 1 is implemented using an application for executing arbitrary functions. The application unit 1 generates data to be transmitted to external devices. The application unit 1 inputs, to the control unit 51, transmission requests for transmitting data to external devices. A transmission request includes control information to be used in controlling data transmission.

The control information contains, for example, a read address, a write address, the data size, and the degree of priority (as an attribute). The read address indicates the beginning address of the source area for reading. The write address indicates the beginning address of the destination area for writing. The data size indicates the size of the target data for transmission. The degree of priority (an attribute) indicates the degree of priority of data transmission. In the communication device 10 according to the first embodiment, the degree of priority represents, for example, the real-time type or the best-effort type.

Meanwhile, there can be one or more application units 1. For example, in the case of an in-vehicle system, it is expected that a plurality of applications is executed that includes applications such as braking control that require real-time capability, in-vehicle infotainment applications such as car navigation, and applications for transmitting data such as the travelling record.

The memory unit 2 stores data. For example, the memory unit 2 stores the data generated by the application unit 1. Moreover, for example, the memory unit 2 stores computer programs executed in the application unit 1 and the control unit 51; control information of the transferring unit 4; and session information to be used in communication with external devices.

More particularly, examples of the memory unit 2 include a static random access memory (SRAM), a synchronous dynamic random access memory (SDRAM), a solid state drive (SSD), a hard disk drive (HDD), and a secure digital (SD) card. Meanwhile, the memory unit 2 can be configured using a plurality of physically-separated memory devices.

The transmission buffer 3 stores data. For example, the transmission buffer 3 temporarily stores the data (frames) to be transmitted to external devices.

More particularly, examples of the transmission buffer 3 include an SRAM, an SDRAM, an SSD, an HDD, and an SD card. Meanwhile, the transmission buffer 3 can be configured using a plurality of physically-separated memory devices. Moreover, the memory unit 2 and the transmission buffer 3 can be configured using a single logically-separated memory device.

The transferring unit 4 receives a transfer request from the control unit 51 as a request for transferring data specified in the transmission request as described above, and performs data transfer between the memory unit 2 and the transmission buffer 3.

More particularly, the transferring unit 4 is a direct memory access controller (DMAC), for example. Thus, a transfer request is a DMA request, for example.

The control unit 51 performs control to transfer data to the transmission buffer 3. More particularly, the control unit 51 receives a transmission request from the application unit 1, and inputs (issues) a transfer request to the transferring unit 4 for transferring the data stored in the memory unit 2 to the transmission buffer 3. Moreover, the control unit 51 receives a transfer completion notification from the transferring unit 4, and inputs a transmission request to the communicating unit 6 for transmitting the data that has already been transferred. The transmission request that is input to the communicating unit 6 includes, for example, the addresses of the data (frames) to be transmitted and the data size.

Meanwhile, in addition to issuing a transfer request, the control unit 51 can also perform protocol processing with respect to the data. In the protocol processing, for example, data equivalent to a single frame is extracted from the data stored in the memory unit 2; and an Internet protocol (IP) header, a transmission control protocol (TCP) header, and an Ethernet header is added to the extracted data.

Meanwhile, when a notification indicating that data is restricted from being transferred is received from the determining unit 52; for example, the control unit 51 delays the transfer of the data that is restricted from being transferred. Herein, regarding the data that is restricted from being transferred, any arbitrary transfer control method can be implemented. For example, the control unit 51 can prohibit the transfer of the data that is restricted from being transferred. Alternatively, for example, from among a plurality of pieces of data that is restricted from being transferred, the control unit 51 can allow the transfer of some pieces of data and can delay the transfer of some pieces of data (or can prohibit the transfer of some pieces of data).

According to the state of the communication device 10, the determining unit 52 determines the data to be restricted from being transferred. More particularly, for example, from the state of the access load of the memory and the bus, the determining unit 52 determines whether or not to allow the issuance of transfer requests for transferring data having a low degree of priority. For example, the data having a low degree of priority implies the data having the degree of priority to be lower than a priority threshold value.

Meanwhile, regarding the determination of the access load, any arbitrary determination method can be implemented. For example, the access load can be determined according to the number of transfer requests that are currently received by the transferring unit 4. Alternatively, for example, a memory controller and a bus controller of the communication device 10 can be configured to have a dedicated circuit for obtaining the current quantity of data transfer and the current number of accesses, and the access load, and can be determined from the information obtained by the dedicated circuits.

When a transmission request for transmitting data (frames) is received from the control unit 51, the communicating unit 6 transmits the data stored in the transmission buffer 3 to external devices. More particularly, for example, the communicating unit 6 performs media access control (MAC) processing of Ethernet (registered trademark) and performs physical layer (PHY) processing. Once the data transmission is completed, the communicating unit 6 inputs a transmission completion notification to the control unit 51. Herein, any arbitrary method can be implemented for informing of the transmission completion notification. Examples of the method for informing of the transmission completion notification include notification using an interrupt signal and notification using a descriptor.

Operations of Application Unit

FIG. 2 is a flowchart for explaining an example of the operations performed by the application unit 1 according to the first embodiment. More particularly, the flowchart illustrated in FIG. 2 indicates the operations during the transmission request processing performed by the application unit 1.

Firstly, the application unit 1 performs initialization for the purpose of transmitting data to and receiving data from the destination external device (Step S1). More particularly, the application unit 1 instructs the control unit 51 to specify the destination external device, to specify the network interface to be used in communication, and to specify the communication protocol to be used in communication.

In the communication device 10 according to the first embodiment, the degree of priority of the data to be transmitted is specified. Herein, any arbitrary method can be implemented for specifying the degree of priority. For example, as the method for specifying the degree of priority, the priority code point (PCP) of the IEEE 802.1p standard can be directly specified. Alternatively, for example, as the method for specifying the degree of priority, the best-effort traffic or the real-time traffic can be specified. Still alternatively, as the method for specifying the degree of priority, the delay period that is allowed at the time of keeping the data transmission on hold can be specified.

Meanwhile, regarding the degree of priority of the data to be transmitted, the timing of specifying the degree of priority can be arbitrary. For example, the timing of specifying the degree of priority can be during the initialization operation performed at Step S1. Alternatively, for example, the degree of priority can be specified every time a data transmission request is issued at Step S3.

Then, the application unit 1 stores the target data for transmission in the memory unit 2 (Step S2). The data stored at Step S2 can be arbitrary data. For example, in the case of an application by which the application unit 1 controls a sensor, the data stored at Step S2 represents sensor data obtained from the sensor. Alternatively, for example, in the case of an application by which the application unit 1 controls a camera, the data stored at Step S2 represents video data obtained from the camera. Still alternatively, in the case of an application by which the application unit 1 analyzes data, the data stored at Step S2 represents data indicating the analysis result. Still alternatively, in the case of an application by which the application unit 1 controls external devices, the data stored at Step S2 represents controls data to be used in controlling the external devices.

Subsequently, the application unit 1 issues a transmission request for transmitting the data stored at Step S2, and instructs the control unit 51 to transmit the data (Step S3). The transmission request includes, for example, the address in the memory unit 2 at which the data to be transmitted is stored, the size of the data to be transmitted, and the address of the writing destination. Moreover, as described earlier, the transmission request can also include the degree of priority of the data.

Then, the application unit 1 determines whether or not a transmission completion notification is received from the control unit 51 (Step S4). If a transmission completion notification is not yet received (No at Step S4), then the application unit 1 waits for the reception of a transmission completion notification from the control unit 51. When a transmission completion notification is received (Yes at Step S4), the application unit 1 ends the transmission request processing.

Meanwhile, with reference to FIG. 2, in order to simplify the explanation, the transmission request processing ends in response to the reception of a transmission completion notification. However, alternatively, the transmission request processing can be continued instead of ending it in response the reception of a transmission completion notification. In that case, the transmission request processing of the application unit 1 returns to the operation at Step S2.

Operations of Control Unit

FIG. 3 is a diagram illustrating an example of the operations performed by the control unit 51 according to the first embodiment. When an initialization request is received from the application unit 1, the control unit 51 performs an initialization operation including interface setting, initialization of the communicating unit 6, and communication protocol setting; and starts a control operation for controlling the transferring unit 4 and the communicating unit 6.

The control operation for controlling the transferring unit 4 and the communicating unit 6 includes a request issuance operation (Step S11) and a transmission completion operation (Step S12).

The request issuance operation includes issuing a transfer request based on a transmission request received from the application unit 1. The details of the request issuance operation are given later with reference to FIG. 5.

The transmission completion operation includes processing a transmission completion notification received from the communicating unit 6. The details of the transmission completion operation are given later with reference to FIG. 7.

FIG. 4 is a diagram illustrating an exemplary functional configuration of the control unit 51 according to the first embodiment. The control unit 51 according to the first embodiment includes an issuance processing unit 511, a transmission completion processing unit 512, a transmission request queue 513, a temporary queue 514, and a completion standby queue 515.

The issuance processing unit 511 performs the abovementioned request issuance operation that issues a transfer request to the transferring unit 4 and a transmission request to the communicating unit 6.

The transmission completion processing unit 512 receives a transmission completion notification from the communicating unit 6 and performs the transmission completion operation mentioned above.

The transmission request queue 513 holds the transmission requests received from the application unit 1.

The temporary queue 514 temporarily holds, from among the transmission requests received from the application unit 1, the transmission requests for transmitting the data that has been restricted from being transferred from the memory unit 2 to the transmission buffer 3.

The completion standby queue 515 holds the transmission requests for which the corresponding transfer requests are already processed and for which a transmission completion notification is awaited from the communicating unit 6.

Example of Request Issuance Operation

Figure 5:
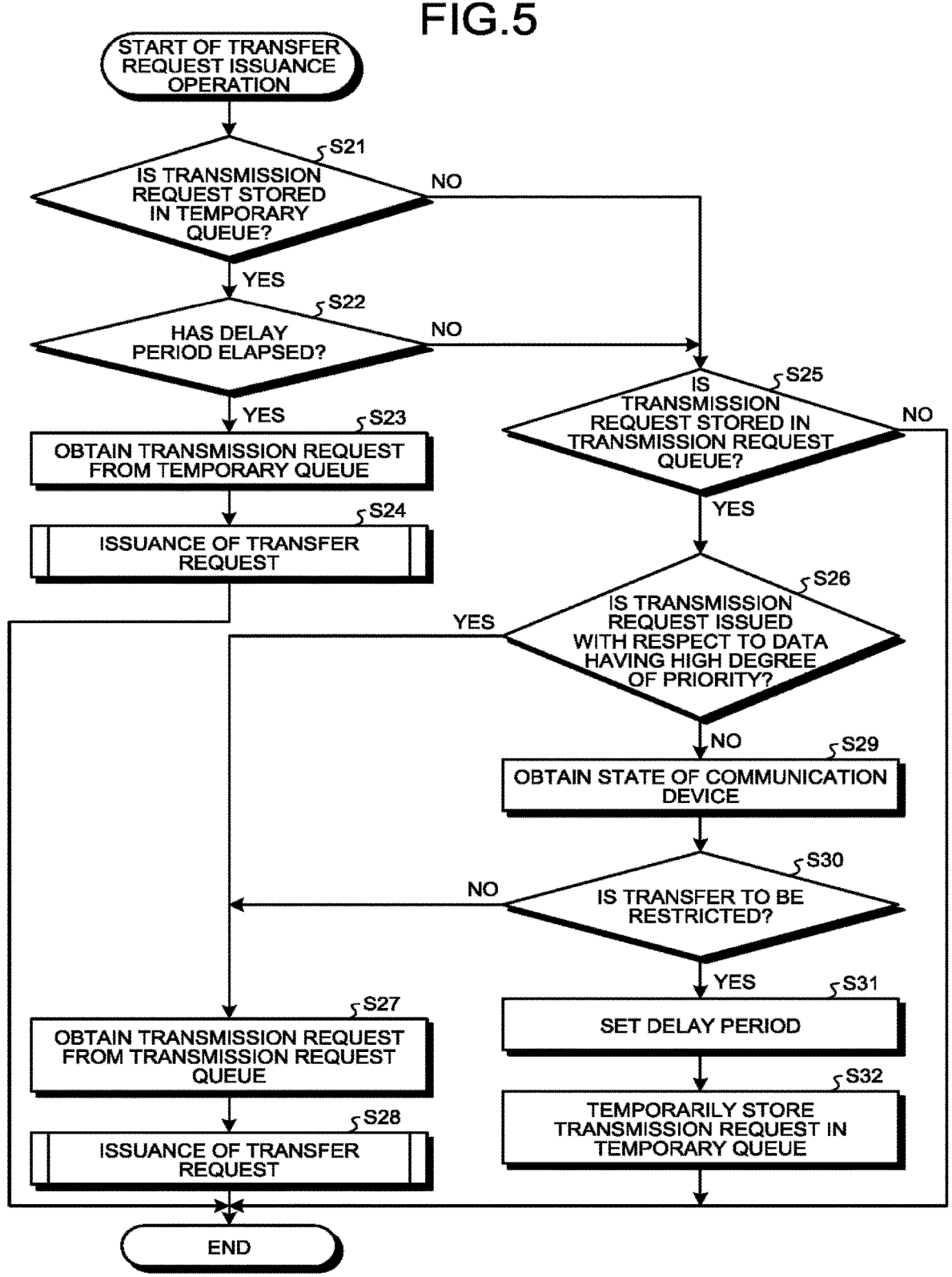
FIG. 5 is a flowchart for explaining the details of the operation performed (at Step S11) by an issuance processing unit and a determining unit according to the first embodiment.

FIG. 5 is a flowchart for explaining the details of the operation performed (at Step S11) by the issuance processing unit 511 and the determining unit 52 according to the first embodiment. Firstly, the issuance processing unit 511 determines whether or not there is any transmission request in the temporary queue 514 whose processing has been postponed (Step S21).

If any such transmission request is held in the temporary queue 514 (Yes at Step S21), then the issuance processing unit 511 checks the oldest transmission request that was temporarily stored in the temporary queue 514, and determines whether or not the delay period set at the time of temporary storage has elapsed (Step S22).

If the delay period has elapsed (Yes at Step S22), then the issuance processing unit 511 obtains, from the temporary queue 514, the transmission request for which the delay period has elapsed (Step S23). Then, the issuance processing unit 511 issues a transfer request for transferring the data that is specified in the transmission request obtained at Step S23 (Step S24), and ends the operations (i.e., switches to the processing of the next transmission request). Meanwhile, the details of the operation performed at Step S24 are described later with reference to FIG. 6.

If there is no transmission request held in the temporary queue 514 (No at Step S21) or if the delay period for the transmission request held in the temporary queue 514 has not elapsed (No at Step S22), then the issuance processing unit 511 determines whether or not there is any transmission request held in the transmission request queue 513 (Step S25). Meanwhile, for example, immediately after the initialization operation performed at Step S1 (see FIG. 2), there is no transmission request held in the temporary queue 514.

When there is no transmission request held in the transmission request queue 513 (No at Step S25), then the transmission request queue 513 ends the operations (i.e., switches to the processing of the next transmission request). Herein, when there is no transmission request held in the transmission request queue 513, even if the processing for the next transmission request is started, there is no transmission request to be processed. For that reason, the issuance processing unit 511 can halt the processing until a transmission request is issued by the application unit 1.

When there is a transmission request held in the transmission request queue 513 (Yes at Step S25), the issuance processing unit 511 determines whether or not the transmission request is issued with respect to the data having a high degree of priority (Step S26). For example, the data having a high degree of priority implies the data having the degree of priority to be higher than the priority threshold value.

If the transmission request is issued with respect to the data having a high degree of priority (Yes at Step S26), then the issuance processing unit 511 obtains the transmission request from the transmission request queue 513 (Step S27). Then, the issuance processing unit 511 issues a transfer request for transferring the data that is specified in the transmission request obtained at Step S27 (Step S28), and ends the operations (i.e., switches to the processing of the next transmission request). The details of the operation performed at Step S28 are described later with reference to FIG. 6.

If the transmission request is not issued with respect to the data having a high degree of priority (No at Step 326), the determining unit 52 obtains the state of the communication device 10 (Step S29). In the first embodiment, the state of the communication device 10 implies, for example, the access state of at least one of the memory unit 2, the transmission buffer 3, and the bus that connects the memory unit 2 and the transmission buffer 3.

Then, the determining unit 52 determines whether or not the data not having a high degree of priority (i.e., the data having a low degree of priority) is to be restricted from being transferred (Step S30). More particularly, for example, if the access load of at least one of the memory unit 2, the transmission buffer 3, and the bus that connects the memory unit 2 and the transmission buffer 3 is higher than an access threshold value, then the determining unit 52 determines that the data not having a high degree of priority is to be restricted from being transferred.

If the data is not to be restricted from being transferred (No at Step S30), then the system control returns to Step S27 and the issuance processing unit 511 again performs the operations at Steps S27 and S28; and then ends the operations (i.e., switches to the processing of the next transmission request).

If the data is to be restricted from being transferred (Yes at Step S30); then the issuance processing unit 511 obtains, from the transmission request queue 513, the transmission request for transmitting the data not having a high degree of priority and sets a delay period that is allowed at the time of keeping the transmission of the data on hold (i.e., the period of time for which the transmission request is temporarily stored in the temporary queue 514) (Step S31). Herein, any arbitrary method can be implemented for setting the delay period. For example, the delay period can be a fixed period specified in the initialization operation performed at Step S1 (see FIG. 2). Alternatively, for example, the delay period can be calculated based on each bandwidth used by the memory and the bus.

Then, the issuance processing unit 511 temporarily stores, in the temporary queue 514, the transmission request for which the delay period has been set at Step S31 (Step S32); and ends the operations (i.e., switches to the processing of the next transmission request).

Figure 6:
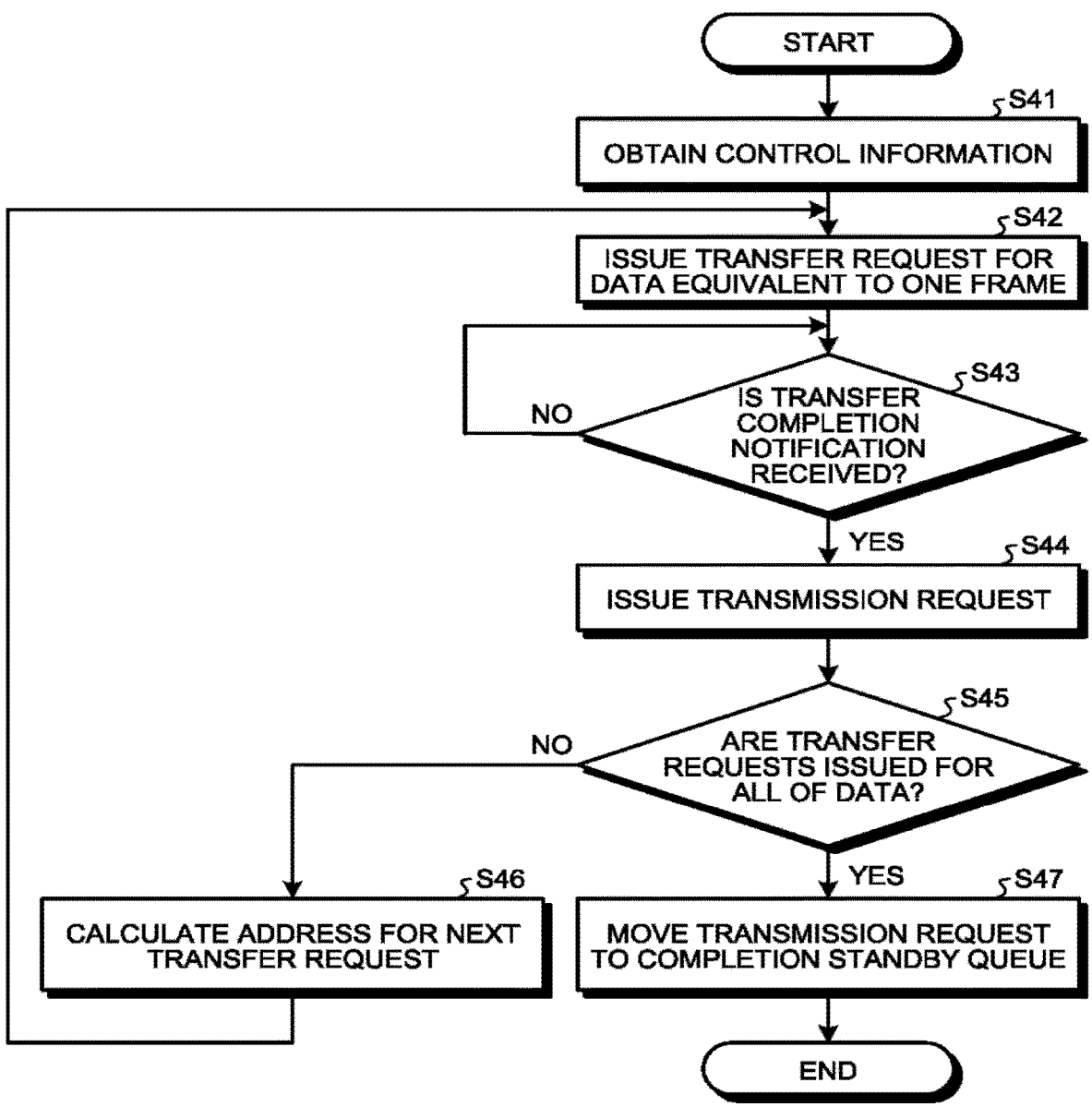
FIG. 6 is a flowchart for explaining the details of the operations performed (at Steps S24 and S28) by the issuance processing unit according to the first embodiment.

FIG. 6 is a flowchart for explaining the details of the operations performed (at Steps S24 and S28) by the issuance processing unit 511 according to the first embodiment. Firstly, the issuance processing unit 511 obtains control information such as the read address, the write address, and the data size from the transmission request (Step S41). Then, the issuance processing unit 511 issues a transfer request to the transferring unit 4 for transferring data of the size storable in a single frame (Step S42). Regarding the maximum size of a single frame, the value set in the initialization operation, which is performed at Step S1 (see FIG. 2), is used.

Then, the issuance processing unit 511 determines whether or not a transfer completion notification is received from the transferring unit 4 (Step S43). If a transfer completion notification is not yet received (No at Step S43), then the issuance processing unit 511 waits for the reception of a transfer completion notification.

When a transfer completion notification is received (Yes at Step S43), the issuance processing unit 511 issues a transmission request to the communicating unit 6 for transmitting the data that has already been transferred, and instructs the communication unit 6 to transmit the data (Step S44).

Subsequently, the issuance processing unit 511 determines whether or not transfer requests have been issued for all of the data specified in the transmission request (Step S45).

If transfer requests are not yet issued for all of the data (No at Step S45), then the issuance processing unit 511 shifts the read address and the write address by an amount equivalent to the memory size for which transfer requests have been issued, and calculates the address for the next transfer request (Step S46). After the operation at Step S46 is performed, the system control returns to Step S42.

When transfer requests are issued for all of the data (Yes at Step S45), the issuance processing unit 511 moves the transmission request either from the transmission request queue 513 (in the case of Step S28) or from the temporary queue 514 (in the case of Step S24) to the completion standby queue 515 (Step S47), and ends the operations.

Transmission Completion Operation

Figure 7:
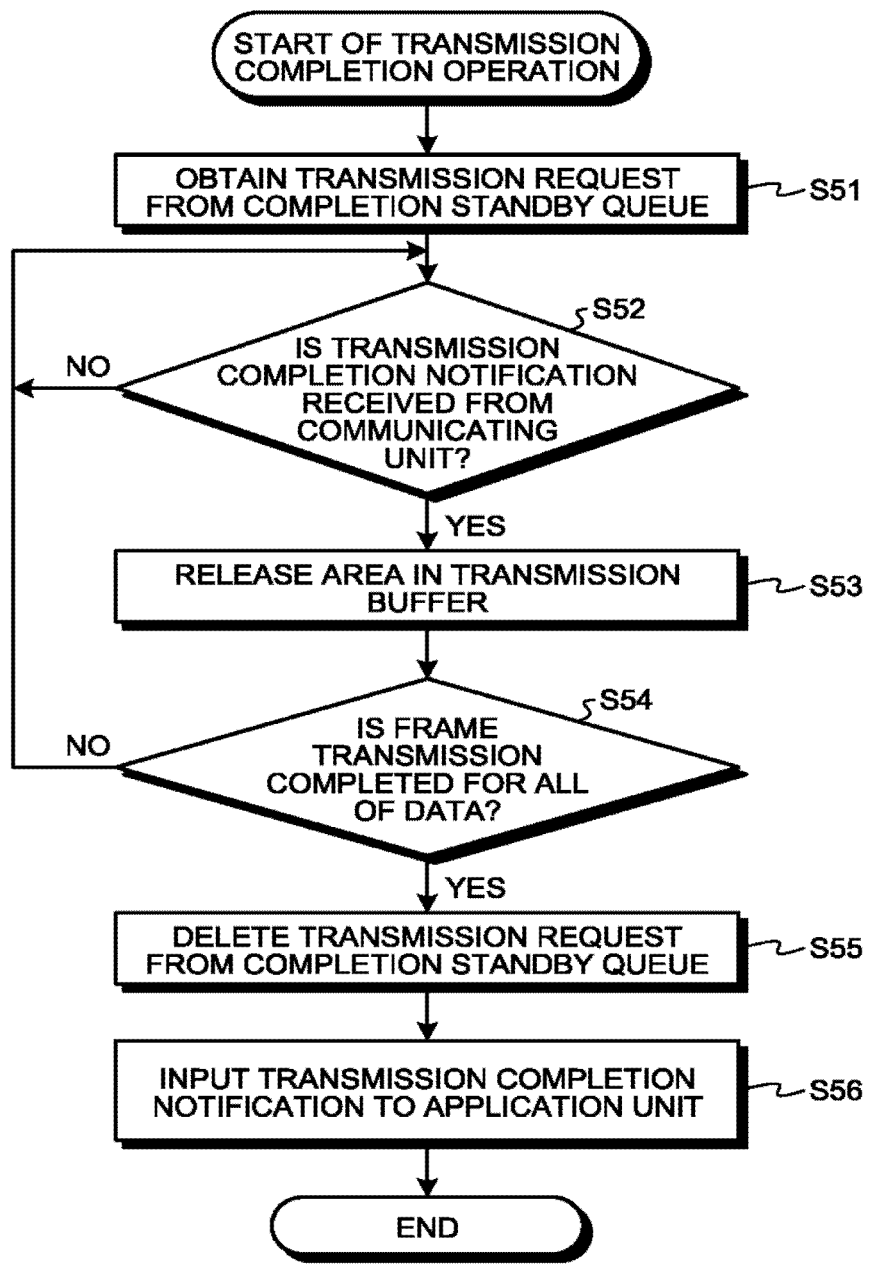
FIG. 7 is a flowchart for explaining the details of the operation performed (at Step S12) by a transmission completion processing unit according to the first embodiment.

FIG. 7 is a flowchart for explaining the details of the operation performed (at Step S12) by the transmission completion processing unit 512 according to the first embodiment. Firstly, the transmission completion processing unit 512 obtains a transmission request from the completion standby queue 515 (Step S51). Then, the transmission completion processing unit 512 determines whether or not a transmission completion notification is received from the communicating unit 6 (Step S52). If the transmission completion notification is not yet received (No at Step S52), the transmission completion processing unit 512 waits for the reception of a transmission completion notification.

When a transmission completion notification is received (Yes at Step S52), the transmission completion processing unit 512 releases an area in the transmission buffer 3 in which the already-transmitted data (frames) was stored (Step S53). Meanwhile, the release of the area in the transmission buffer 3 can be alternatively performed by the communicating unit 6. When the release of the area in the transmission buffer 3 is performed by the communicating unit 6, the transmission completion processing unit 512 does not release any area in the transmission buffer 3.

Then, the transmission completion processing unit 512 determines whether or not the frame transmission is completed for all of the data specified in the transmission request by the application (Step S54). If the frame transmission is not yet completed for all of the data (No at Step S54), then the system control returns to Step S52.

When the frame transmission is completed for all of the data (Yes at Step S54), the transmission completion processing unit 512 deletes the transmission request from the completion standby queue 515 (Step S55). Subsequently, the transmission completion processing unit 512 inputs a transmission completion notification to the application unit 1 (Step S56).

As described above, in the transfer control device 5 according to the first embodiment, the control unit 51 performs control for transferring data to the transmission buffer 3 (a first transmission buffer). According to the state of the communication device 10, the determining unit 52 determines the data to be restricted from being transferred. When the transfer is restricted, the control unit 51 delays the transfer of the data that is restricted from being transferred.

As a result, in the transfer control device 5 according to the first embodiment, the transfer of the data to the communicating unit 6 (the transmission buffer 3) can be controlled by taking into account the timings of data transmission from the communicating unit 6. More particularly, if the access load of at least one of the memory unit 2, the transmission buffer 3, and the bus that connects the memory unit 2 and the transmission buffer 3 is higher than the access threshold value; then the transfer of the data having a low degree of priority can be delayed. Hence, it becomes possible to prevent a situation in which the memory and the bus get occupied due to the transfer of the data having a low degree of priority, and thus the data having a high degree of priority can be transmitted from the communicating unit 6 without delay.

Second Embodiment

Given below is the explanation of a second embodiment. In the explanation of the second embodiment, the identical portion to the first embodiment is not explained again, and only the differences from the first embodiment are explained.

Example of Functional Configuration

Figure 8:
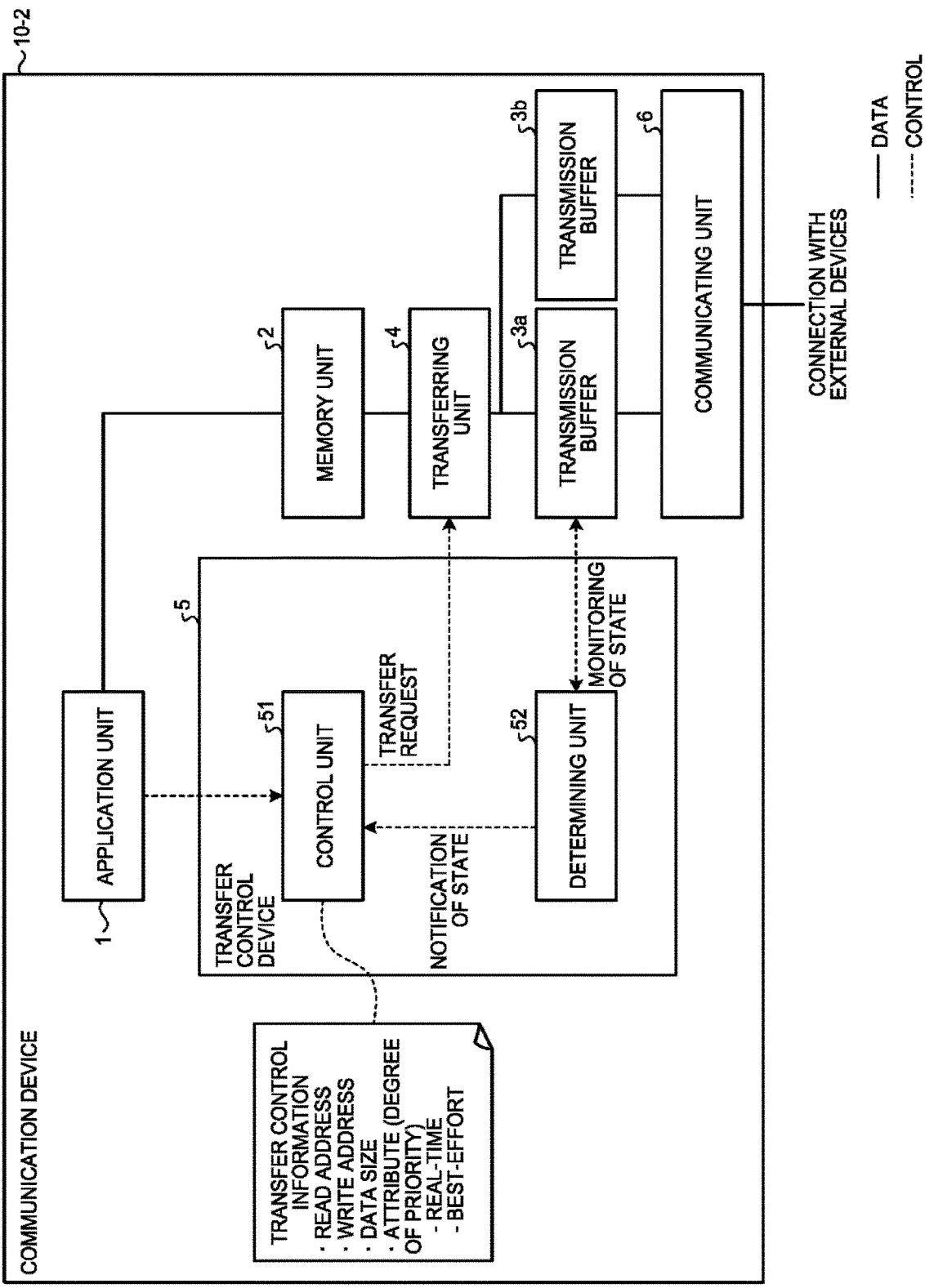
FIG. 8 is a diagram illustrating an exemplary functional configuration of a communication device according to a second embodiment.

FIG. 8 is a diagram illustrating an exemplary functional configuration of a communication device 10-2 according to the second embodiment. The communication device 10-2 according to the second embodiment includes the application unit 1, the memory unit 2, transmission buffers 3a and 3b, the transferring unit 4, the transfer control device 5, and the communicating unit 6. The transfer control device 5 further includes the control unit 51 and the determining unit 52.

The transmission buffer 3a stores data having a high degree of priority. Herein, the data having a high degree of priority implies the data having the degree of priority to be higher than the priority threshold value. More particularly, in the second embodiment, the data having a high degree of priority represents real-time frames.

The transmission buffer 3b stores data having a low degree of priority. Herein, the data having a low degree of priority implies the data having the degree of priority to be lower than the priority threshold value. More particularly, in the second embodiment, the data having a low degree of priority represents best-effort frames.

Meanwhile, as long as there are two or more types of the degree of priority, it is possible to have any arbitrary number of types of the degree of priority. For example, when there are two types ("0" and "1") of the degree of priority and when the degree of priority increases in proportion to the value, the transmission buffer 3a stores the data having the degree of priority of "1" and the transmission buffer 3b stores the data having the degree of priority of "0". Meanwhile, in the communication device 10 according to the second embodiment, the number of transmission buffers 3 is equal to the number of types of the degree of priority.

The transmission buffers 3a and 3b are memory devices such as SRAMs, SDRAMs, SSDs, HDDs, and SD cards. The transmission buffers 3a and 3b can be configured using a plurality of physically-separated memory devices. Alternatively, the transmission buffers 3a and 3b can be configured using a single logically-separated memory device.

The communicating unit 6 sends the data (frames) stored in the transmission buffers 3a and 3b to external devices. At that time, the communicating unit 6 performs a data transmission operation by taking into account the degree of priority. The data transmission operation performed by taking into account the degree of priority can be any arbitrary operation. For example, when the data having a high degree of priority is stored in the transmission buffer 3a; as in the case of following the strict priority, the communicating unit 6 can invariably transmit the data having a high degree of priority from the transmission buffer 3a. Alternatively, for example, the communicating unit 6 can implement an algorithm such as Credit Shaper of the IEEE 802.1 Qav standard, and can determine whether the data is transmitted from among the data stored in the transmission buffer 3a or the data stored in the transmission buffer 3b.

The determining unit 52 determines, from the state of the transmission buffers 3a and 3b of the communication device 10-2, whether or not to allow the processing of a transfer request with respect to the data having a low degree of priority, and notifies the control unit 51 about the determination result.

Example of Determination Method

Figure 9A:
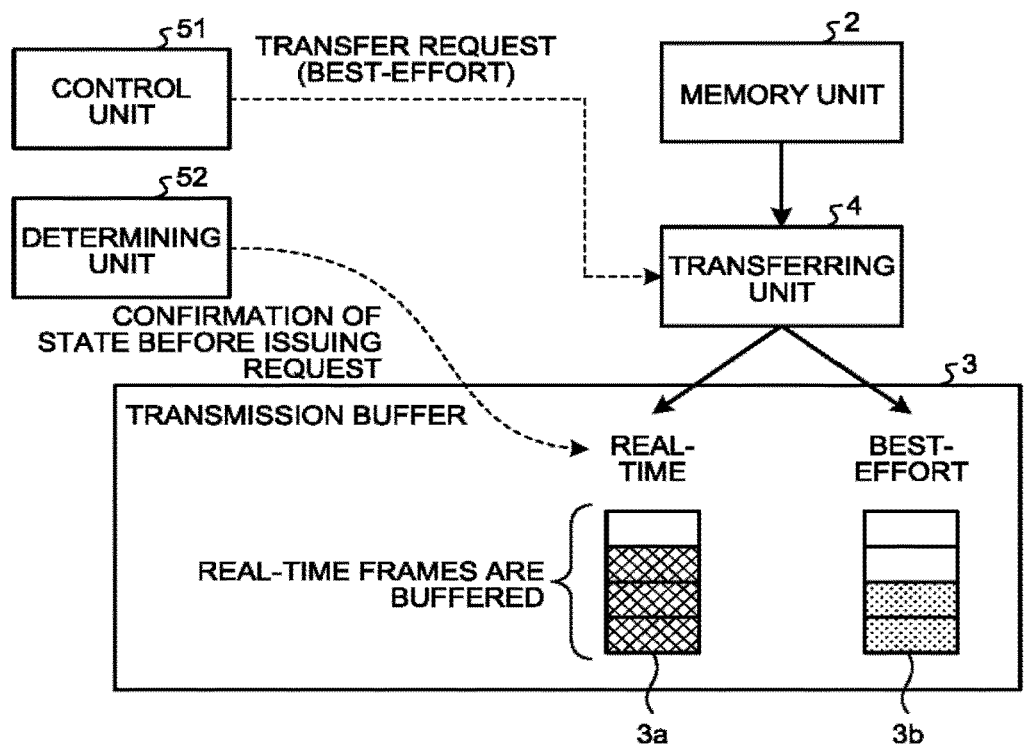
FIGS. 9A and 9B are diagrams illustrating an example of a determination method according to the second embodiment.
Figure 9B:
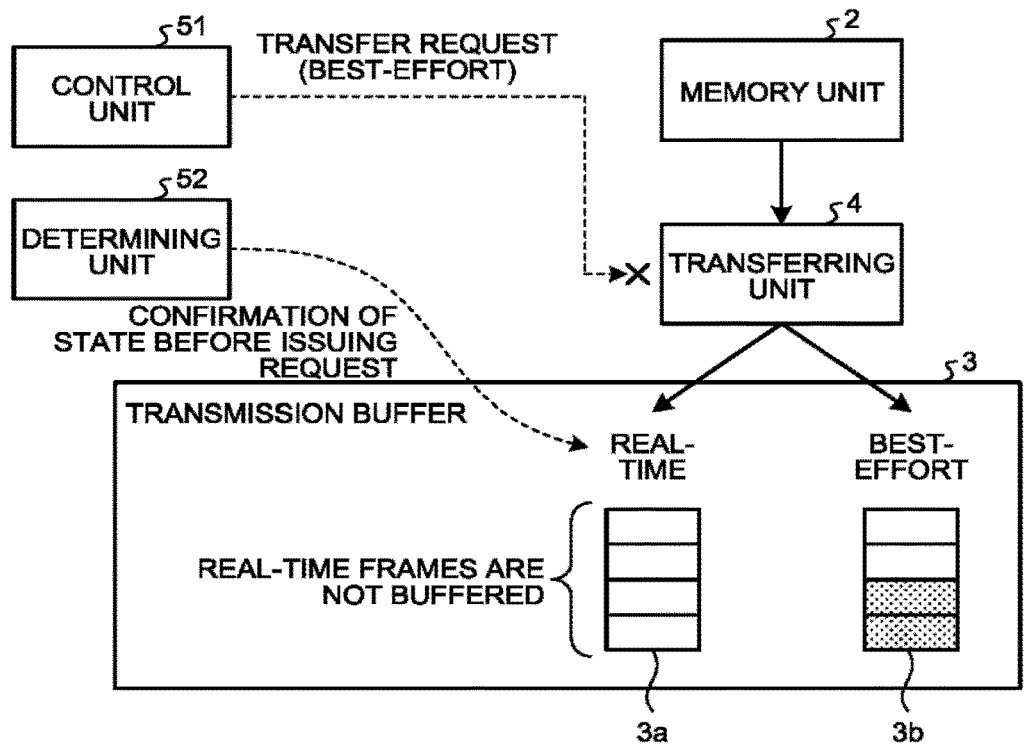

FIGS. 9A and 9B are diagrams illustrating an example of the determination method according to the second embodiment. When the number of pieces of data stored in the transmission buffer 3a and having the degree of priority to be equal to or greater than the priority threshold value (i.e., the number of real-time frames) is equal to or greater than a data number threshold value, the determining unit 52 does not determine the data having a lower degree of priority than the priority threshold value (i.e., best-effort frames) as the data to be restricted from being transferred (see FIG. 9A).

On the other hand, when the number of pieces of data stored in the transmission buffer 3a and having the degree of priority to be equal to or greater than the priority threshold value (i.e., the number of real-time frames) is smaller than the data number threshold value, the determining unit 52 determines the data having a lower degree of priority than the priority threshold value (i.e., best-effort frames) as the data to be restricted from being transferred (see FIG. 9B).

As a result, it becomes possible to prioritize the operation of storing the real-time frames in the transmission buffer 3a, and to increase the number of real-time frames stored in the transmission buffer 3a. More particularly, if there is no real-time frame stored in the transmission buffer 3a, a transfer request for transferring best-effort frames is suppressed without being promptly processed. As a result, if the application unit 1 issues a transmission request for transmitting real-time frames, the transferring unit 4 can immediately start the transfer of real-time frames to the transmission buffer 3a.

Meanwhile, regarding the priority threshold value and the data number threshold value used in the determination, for example, the values set in the initialization operation performed at Step S1 (see FIG. 2) are used.

Moreover, instead of determining the number of pieces of data (frames), the determining unit 52 can determine the size of the data stored in the transmission buffer 3. More particularly, when the size of the data stored in the transmission buffer 3a and having the degree of priority to be equal to or greater than the priority threshold value is equal to or greater than a data size threshold value, the determining unit 52 does not determine the data having a lower degree of priority than the priority threshold value as the data to be restricted from being transferred (see FIG. 9A). On the other hand, when the size of the data stored in the transmission buffer 3a and having the degree of priority to be equal to or greater than the priority threshold value is smaller than the data size threshold value, the determining unit 52 determines the data having a lower degree of priority than the priority threshold value as the data to be restricted from being transferred (see FIG. 9B).

Example of Issued-Request Processing

Figure 10:
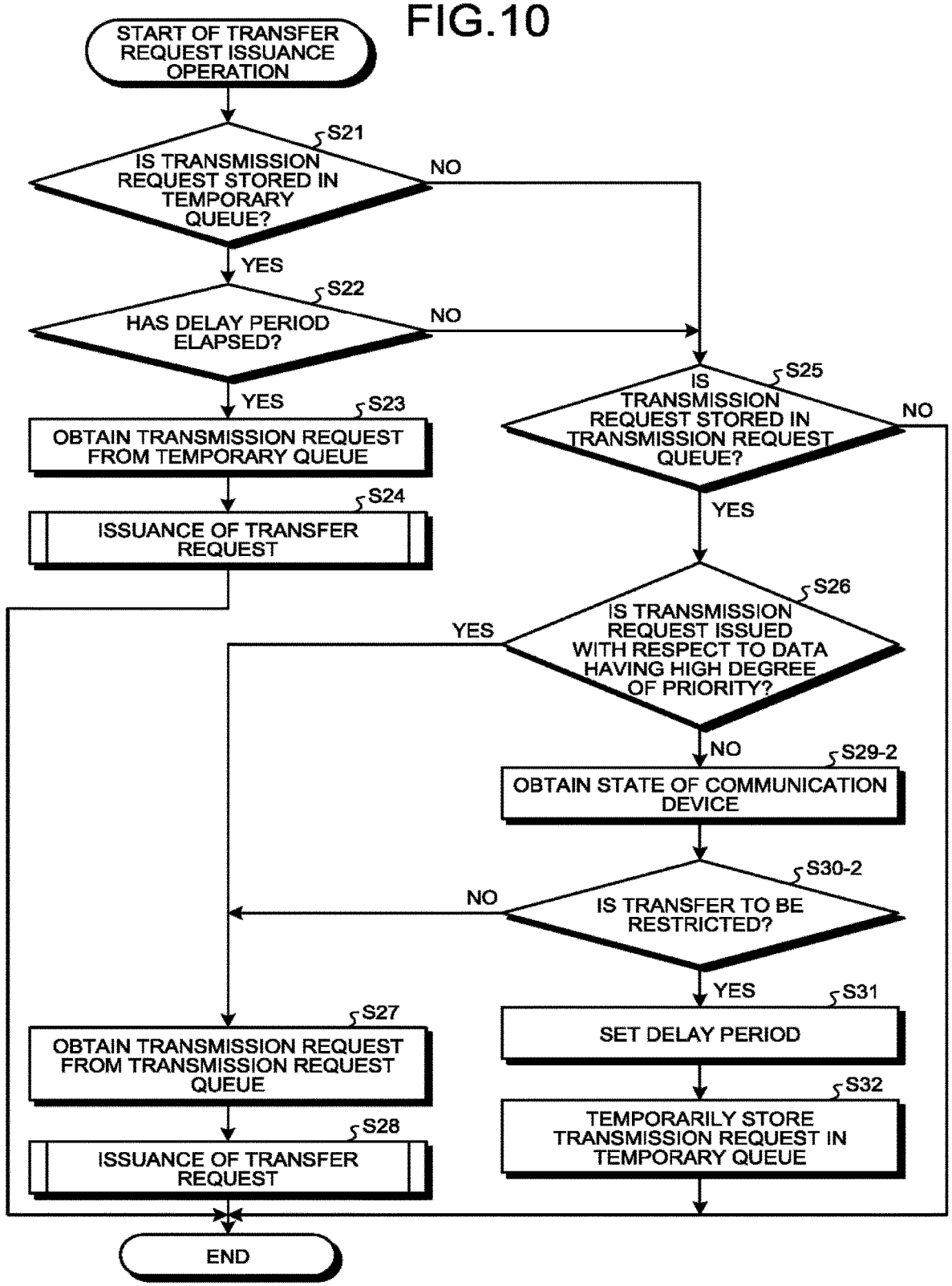
FIG. 10 is a flowchart for explaining the details of the operation performed (at Step S1) by the issuance processing unit and the determining unit according to the second embodiment.

FIG. 10 is a flowchart for explaining the details of the operation performed (at Step S11) by the issuance processing unit 511 and the determining unit 52 according to the second embodiment. In the flowchart illustrated in FIG. 10, the operations performed at Steps S29-2 and S30-2 are different from the operations performed in the first embodiment. Hence, the following explanation is given about the operations performed at Steps S29-2 and S30-2.

Step S29-2

If the transmission request is not issued with respect to the data having a high degree of priority (No at Step S26), the determining unit 52 obtains the state of the communication device 10 (Step S29-2). In the second embodiment, the state of the communication device 10 implies, for example, either the number of pieces or the size of the data stored in the transmission buffer 3a and having the degree of priority to be equal to or greater than the priority threshold value (i.e., real-time frames).

Step S30-2

The determining unit 52 determines whether or not to restrict the transfer of the data not having a high degree of priority (i.e., the data having a low degree of priority) (Step S30-2). More particularly, for example, when the number of pieces of data (or the size of the data) stored in the transmission buffer 3a and having a high degree of priority is smaller than the data number threshold value (or the data size threshold value), the determining unit 52 determines to restrict the transfer of the data not having a high degree of priority (i.e., best-effort frames).

As described above, in the communication device 10-2 (the transfer control device 5) according to the second embodiment, when the data having a high degree of priority (real-time frames) is not sufficiently stored in the transmission buffer 3a, the issuance of a transfer request for transferring the data having a low degree of priority (best-effort frames) is delayed. As a result, when the data having a high degree of priority is not sufficiently stored in the transmission buffer 3a, if a transmission request for transmitting the data having a high degree of priority is issued by the application unit 1, the transferring unit 4 can immediately transfer the data having a high degree of priority, without getting affected by any transfer operation for transferring the data having a low degree of priority.

Third Embodiment

Given below is the explanation of a third embodiment.

In the third embodiment, the identical portion to the second embodiment is not explained again, and only the differences from the second embodiment are explained.

Example of Functional Configuration

Figure 11:
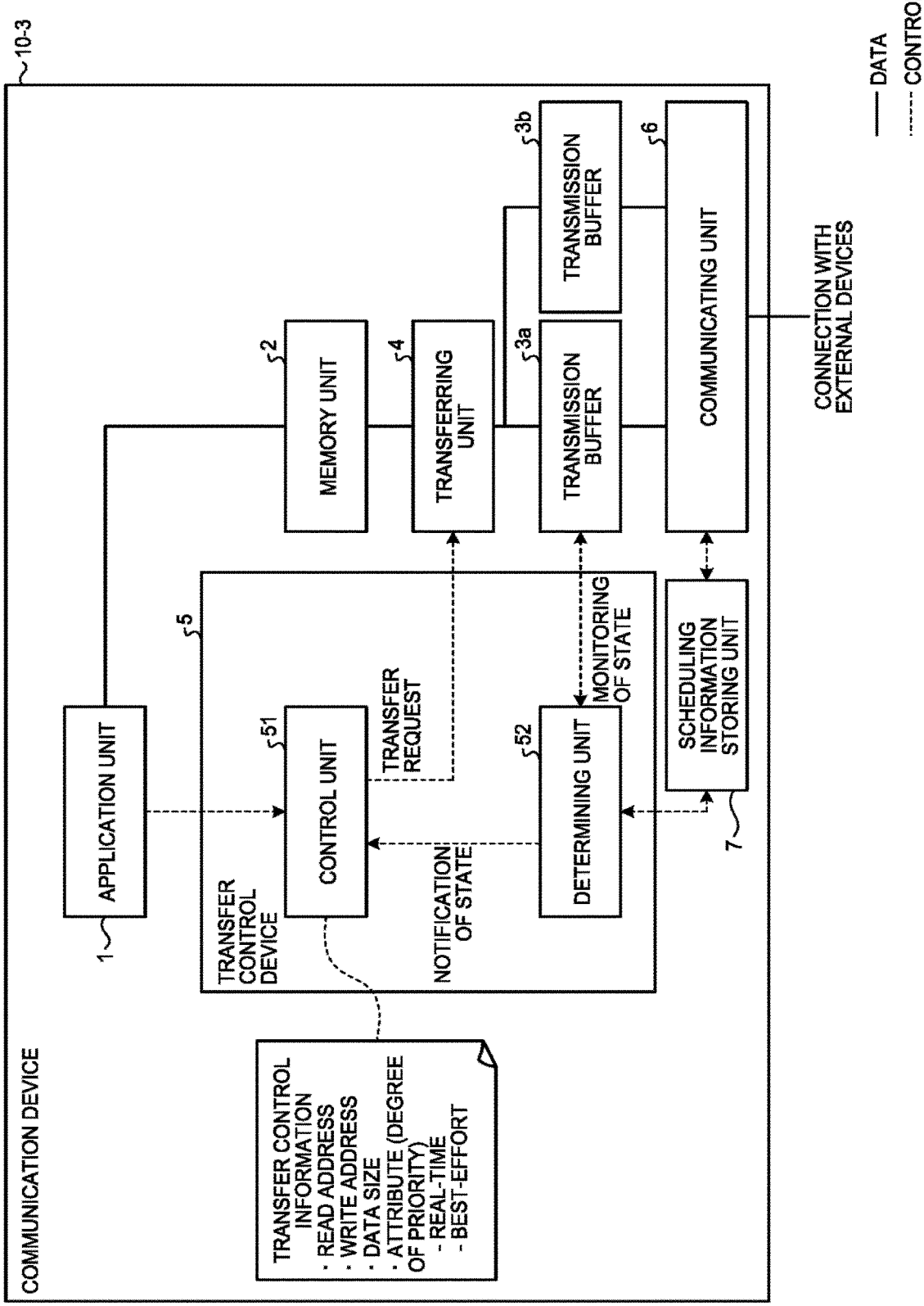
FIG. 11 is a diagram illustrating an exemplary functional configuration of a communication device according to a third embodiment.

FIG. 11 is a diagram illustrating an exemplary functional configuration of a communication device 10-3 according to the third embodiment. The communication device 10-3 includes the application unit 1, the memory unit 2, the transmission buffers 3a and 3b, the transferring unit 4, the transfer control device 5, the communicating unit 6, and a scheduling information storing unit 7. The transfer control device 5 further includes the control unit 51 and the determining unit 52.

The transmission buffer 3a stores, for example, real-time data that is transmitted using real-time communication. The real-time data represents, for example, control signals, which need to be transmitted at regular intervals, and streaming data. Examples of the streaming data include video data and audio data.

The transmission buffer 3b stores, for example, the data to be transmitted using the best-effort communication, such as log information.

The scheduling information storing unit 7 stores scheduling information, which indicates the schedule of the transmission timings for transmitting the data stored in the transmission buffer 3a and the data stored in the transmission buffer 3b. The scheduling information can be set in advance during the initialization operation performed at Step S1 (see FIG. 2), or can be updated as necessary during the operations.

According to the scheduling information, the determining unit 52 determines the data to be restricted from being transferred. Then, the control unit 51 performs control in such a way that the data having the degree of priority to be equal to or greater than the priority threshold value is immediately transferred to the transmission buffer 3a, and performs control in such a way that the data having the degree of priority to be smaller than the priority threshold value is immediately transferred to the transmission buffer 3b unless the transfer of the data is restricted.

More particularly, for example, the determining unit 52 refers to the scheduling information; calculates the number of pieces of transmittable data that are transmittable from the transmission buffer 3a at the next transmission timing; and, if the number of pieces of data stored in the transmission buffer 3a is smaller than the number of pieces of transmittable data, the determining unit 52 determines the data having the degree of priority to be smaller than the priority threshold value as the data to be restricted from being transferred, and if the transfer of the data having the degree of priority to be smaller than the priority threshold value is restricted, the determining unit 52 delays the transfer of the data having the degree of priority to be smaller than the priority threshold value.

The scheduling information represents, for example, a gate control list of the IEEE 802.1Qbv standard. When the scheduling information represents a gate control list, the communicating unit 6 refers to the current timing and the scheduling information; identifies the degree of priority for which the transmission is currently being allowed (i.e., the degree of priority for which the gate is open); and performs the transmission operation for transmitting the data having the identified degree of priority. For example, if the gate for the transmission buffer 3a is open and if there is data stored in the transmission buffer 3a, then the communicating unit 6 performs the transmission operation for transmitting the data stored in the transmission buffer 3a. Alternatively, for example, consider the case in which: there is data stored in the transmission buffer 3a; the gate for the transmission buffer 3a is closed; the gate for the transmission buffer 3b is open; and there is data stored in the transmission buffer 3b. In that case, the communicating unit 6 performs the transmission operation for transmitting the data stored in the transmission buffer 3b.

Meanwhile, in the third embodiment, although there are two types of the degree of priority, it is possible to have three or more types of the degree of priority. In the scheduling information, information about the transmission timings corresponding to the types of the degree of priority is defined.

As a result of referring to the scheduling information and accordingly transmitting the data (frames) from the transmission buffers 3a and 3b, the communicating unit 6 becomes able to transmit the data to external devices at the decided timings. Hence, it becomes possible to guarantee the transmission timings of the data that needs to be transmitted using real-time communication.

Meanwhile, the scheduling information indicates the possibility of occurrence of data transmission (frame transmission); and whether or not the data is actually transmitted is decided depending on whether the data is written in the transmission buffer 3a or the transmission buffer 3b. That is, whether or not the data is actually transmitted is decided depending on the operations performed by the transfer control device 5 and by the application unit 1 positioned at a higher level than the transfer control device 5.

Meanwhile, specific examples of the application unit 1 include an in-vehicle system and a factory automation system.

In an in-vehicle system, the data for which real-time capability is required, such as the data related to automated driving and braking control, is stored in the transmission buffer 3a. On the other hand, the data of the in-vehicle infotainment, such as the car navigation, and the data of the travelling record is stored in the transmission buffer 3b.

In factory automation, the data for which real-time capability is required, such as the control signals of various control devices, is stored in the transmission buffer 3a. Examples of the control devices include programmable logic controllers (PLCs) and input-output (I/O) devices. On the other hand, the operating conditions of devices and information about the production management are stored in the transmission buffer 3b.

Example of Determination Method

Figure 12:
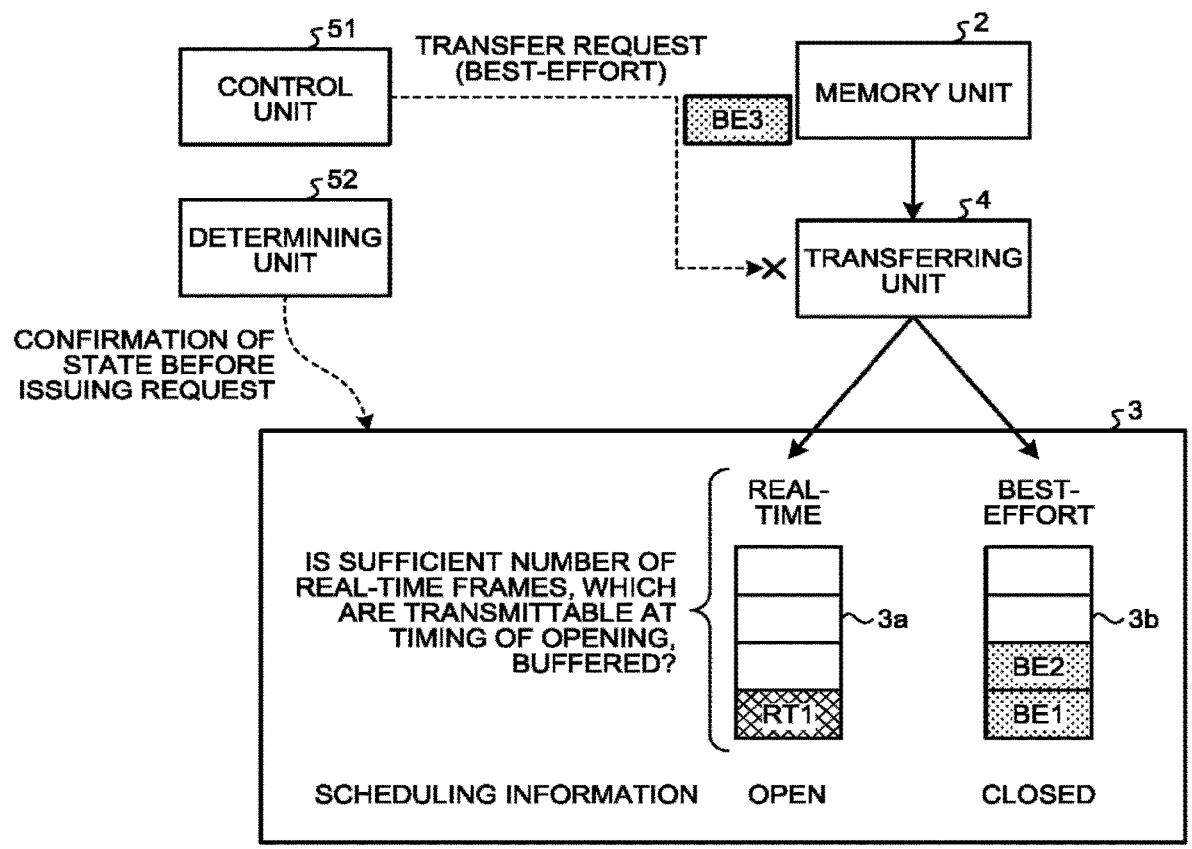
FIG. 12 is a diagram illustrating an example of a determination method according to the third embodiment.

FIG. 12 is a diagram illustrating an example of the determination method according to the third embodiment. Herein, RT1 represents a real-time frame, and BE1 to BE3 represent best-effort frames. The transmission buffer 3a already stores the real-time frame RT1. The transmission buffer 3b already stores the best-effort frames BE1 and BE2.

The determining unit 52 refers to the state of the transmission buffer 3a and the scheduling information; determines whether or not to restrict transfer requests for transferring the data having a low degree of priority (i.e., best-effort frames); and notifies the control unit 51 about the determination result. In the example illustrated in FIG. 12, there is only one real time frame (RT1) stored in the transmission buffer 3a, and that number is smaller than the number of pieces of transmittable data at the next transmission timing. Moreover, in the example illustrated in FIG. 12, regarding the state of the scheduling information at the point of time of the issuance of a transfer request for transferring the best-effort frame BE3 (i.e., regarding the state of the gate), the transmission buffer 3a has an open gate and the transmission buffer 3b has a closed gate.

Regarding the example illustrated in FIG. 12, the fact that it is better to delay the transfer of the data having the degree of priority to be smaller than the priority threshold value (i.e., in FIG. 12, the best-effort frame BE3) is explained below with reference to FIGS. 13A and 13B.

Figure 13A:
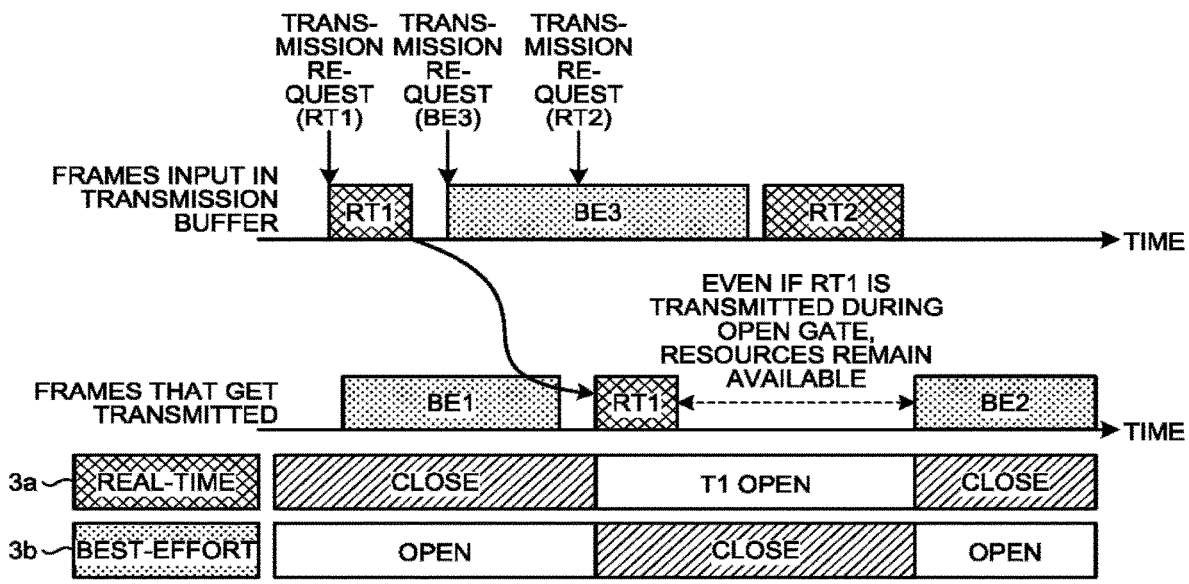
FIGS. 13A and 13B are diagrams for explaining an example of the transfer control according to the third embodiment.
Figure 13B:
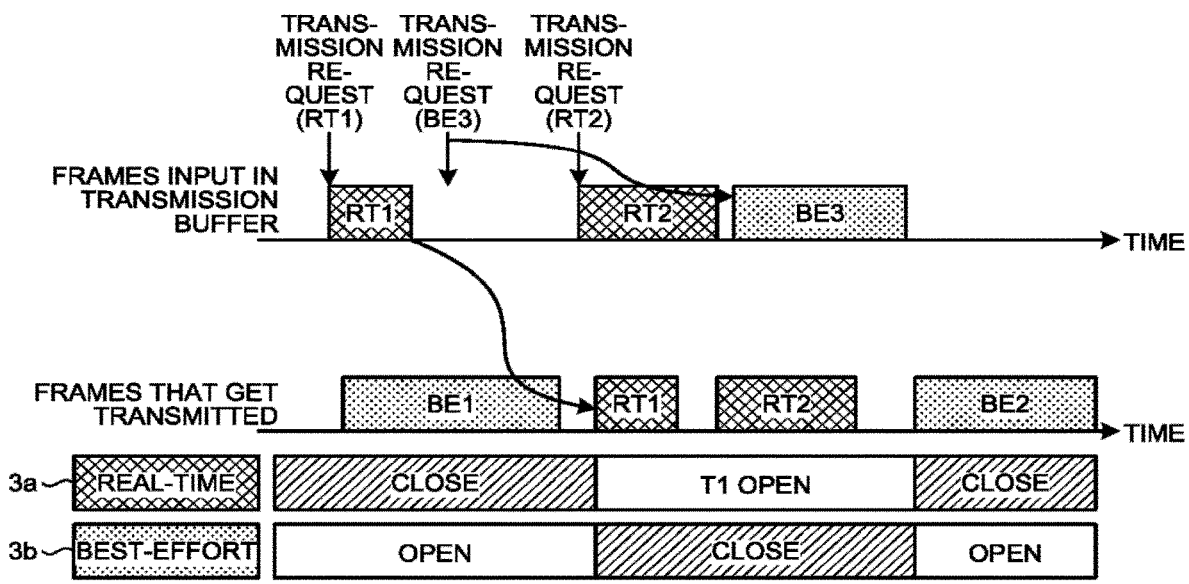

FIGS. 13A and 13B are diagrams for explaining an example of the transfer control according to the third embodiment. In FIGS. 13A and 13B is illustrated the case in which the issuance processing unit 511 receives transmission requests for transmitting the data of the real-time frame RT1, the data of the best-effort frame BE3, and the data of a real-time frame RT2 in that order from the application unit 1. In the example illustrated in FIG. 13A, the transfer requests are issued in the order of reception of the transmission requests. In the example illustrated in FIG. 13B, after issuing a transfer request for transferring the real-time frame RT2, the issuance processing unit 511 issues a transfer request for transferring the best-effort frame BE3.

In FIG. 13A, the horizontal axis represents the temporal axis indicating the following: the transfer period taken for transferring the real-time frame RT1, the best-effort frame BE3, and the real-time frame RT2 to the transmission buffer 3a (3b); the transmission period taken for transmitting the best-effort frame BE1, the real-time frame RT1, and the best-effort frame BE2; and the state of the gates of the transmission buffers 3a and 3b.

In the example illustrated in FIG. 13A, while the transfer request for transferring the best-effort frame BE3 is being processed by the transferring unit 4, the application unit 1 issues a transfer request for transferring the real-time frame RT2. Hence, in the example illustrated in FIG. 13A, the transfer processing of the real-time frame RT2 cannot be started until the transfer processing of the best-effort frame BE3 is completed. Hence, at the transmission timing (T1) for transmitting the next real-time frame, even if there are resources available for transmitting the real-time frame RT2 at the same time of transmitting the real-time frame RT1, since the transfer processing of the real-time frame RT2 is not completed in time, the real-time frame RT2 cannot be transmitted at the next transmission timing for transmitting real-time frames.

On the other hand, in FIG. 13B in which an example of the operations performed by the issuance processing unit 511 according to the third embodiment is illustrated, as a result of delaying the transfer of the best-effort frame BE3 to the transmission buffer 3b, the real-time frame RT2 can be transferred first to the transmission buffer 3a. As a result, at the next transmission timing (T1) for transmitting real-time frames, the communicating unit 6 can transmit the real-time frame RT2 at the same time of transmitting the real-time frame RT1.

That is, with reference to FIG. 13A, it can be said that, in the state in which a sufficient number of real-time frames that can be transmitted during the next opening of the gate of the transmission buffer 3a are not stored in the transmission buffer 3a, since the transfer of the best-effort frame (BE3) gets started, the real-time frame (RT2) cannot be transmitted.

In order to avoid the problem as illustrated in FIG. 13A, the determining unit 52 according to the third embodiment determines whether or not the real-time frames being transmittable in number at the next timing of opening of the gate of the transmission buffer 3a are stored in the transmission buffer 3a. If the real-time frames being transmittable in number are not stored, then the determining unit 52 determines to restrict the transfer of the best-effort frames, and notifies the control unit 51 of the determination result. On the other hand, if the real-time frames being transmittable in number are stored, then the determining unit 52 determines not to restrict the transfer of the best-effort frames, and notifies the control unit 51 of the determination result.

As a result, for example, in the state in which the real-time frames that can be transmitted during the open gate are not stored in the transmission buffer 3a, if a transmission request for transmitting the data having a high degree of priority is issued by the application unit 1, the transferring unit 4 becomes able to immediately transfer the real-time frames including the data having a high degree of priority to the transmission buffer 3a.

As a specific method by which the determining unit 52 determines whether or not the sufficient real-time frames are stored in the transmission buffer 3a, it is possible to think of a method in which, for example, the maximum number of transmittable real-time frames during the open gate is defined in the scheduling information; and, if the number of real-time frames stored in the transmission buffer 3a is smaller than the maximum number of transmittable real-time frames, the transfer of the best-effort frames is restricted. Alternatively, as another method, it is possible to think that, based on the transfer speed (for example, the DMA transfer speed), the determining unit 52 calculates a threshold value from the number of transmittable bytes during the total period of the open gate during X seconds from the current time; and, if the number of bytes of the real-time frames stored in the transmission buffer 3a is smaller than the threshold value, the transfer of the best-effort frames is restricted.

Herein, the determining unit 52 can calculate the delay period for which the transfer of the best-effort frames is to be delayed, and can notify the control unit 51 of the delay period. For example, based on the scheduling information, the delay period is calculated based on the period of time till the next opening of the gate of the transmission buffer 3a and the period of time till the next opening of the gate of the transmission buffer 3b. In that case, at the time of temporarily storing a transmission request in the temporary queue 514, the control unit 51 sets the delay period in the transmission request.

Example of Issued-Request Processing

Figure 14:
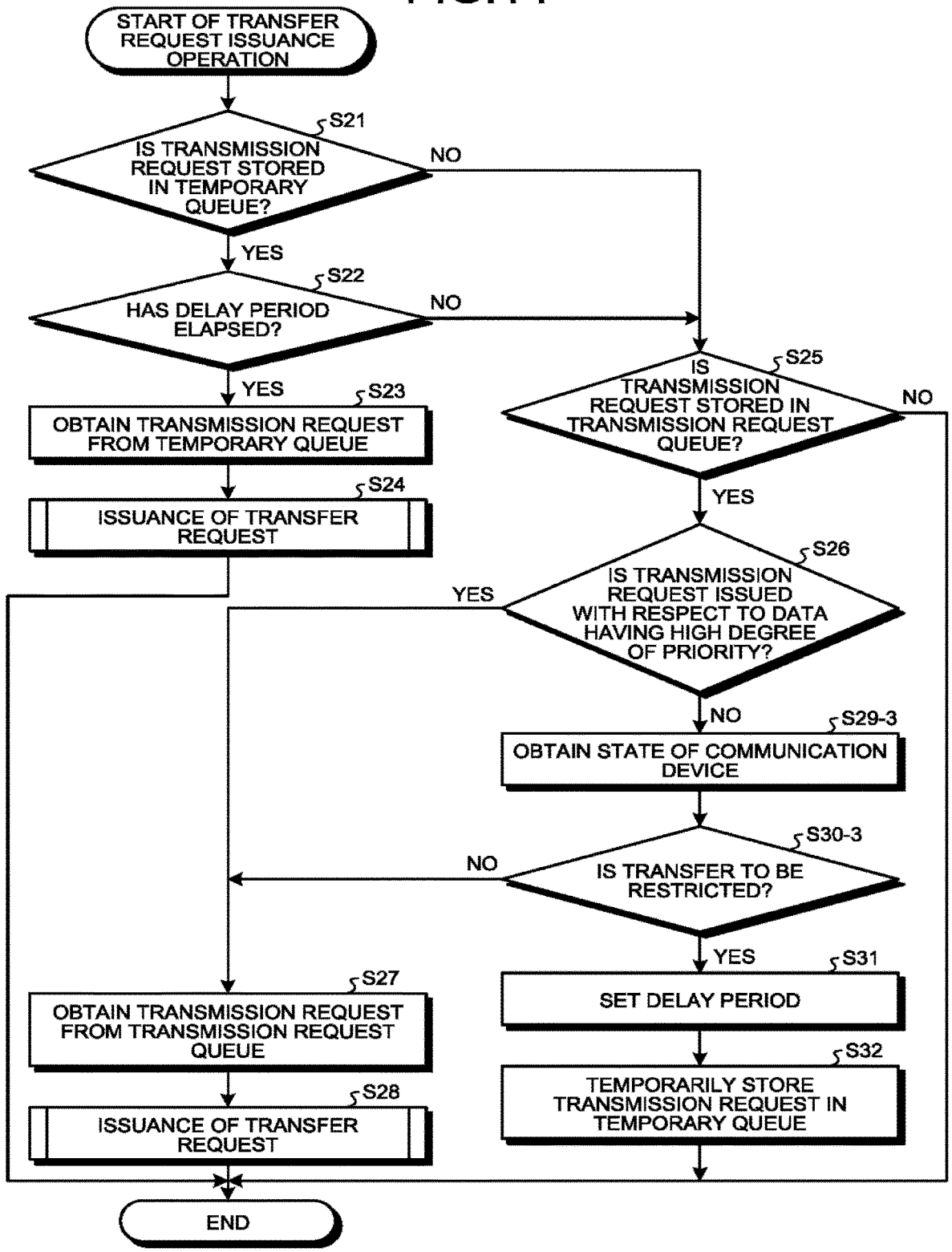
FIG. 14 is a flowchart for explaining the details of the operation performed (at Step S1) by the issuance processing unit and the determining unit according to the third embodiment.

FIG. 14 is a flowchart for explaining the details of the operation performed (at Step S11) by the issuance processing unit 511 and the determining unit 52 according to the third embodiment. In the flowchart illustrated in FIG. 14, the operations performed at Steps S29-3 and S30-3 are different from the operations performed in the second embodiment. Hence, the following explanation is given about the operations performed at Steps S29-3 and S30-3.

Step S29-3

If the transmission request is not issued with respect to the data having a high degree of priority (No at Step S26), the determining unit 52 obtains the state of the communication device 10 (Step S29-3). In the third embodiment, the state of the communication device 10 implies, for example, the number of pieces (or the size) of the data stored in the transmission buffer 3a and the scheduling information.

Step S30-3

The determining unit 52 determines whether or not to restrict the transfer of the data not having a high degree of priority (i.e., the data having a low degree of priority) (Step S30-3). More particularly, for example, the determining unit 52 refers to the scheduling information; calculates the number of pieces (or the size) of the data transmittable from the transmission buffer 3a at the next transmission timing; and, if the number of pieces (or the size) of the data stored in the transmission buffer 3a is smaller than the number of pieces (or the size) of the transmittable data, decides to restrict the transfer of the data not having a high degree of priority (i.e., the best-effort frames).

As described above, in the communication device 10-3 (the transfer control device 5) according to the third embodiment, when there is not a sufficient number of pieces of data that have a high degree of priority (i.e., the real-time frames) and that are transmittable at the timing defined in the scheduling information, the issuance processing unit 511 delays the issuance of a transfer request for transferring the frames having a low degree of priority (i.e., the best-effort frames). As a result, when a sufficient number of pieces of data having a high degree of priority is not stored in the transmission buffer 3a, if a transmission request for transmitting the data having a high degree of priority is issued by the application unit 1, the transferring unit 4 can immediately transfer the data having a high degree of priority, without getting affected by any transfer operation for transferring the data having a low degree of priority.

Lastly, the explanation is given about an exemplary hardware configuration of the communication device 10 and the transfer control device 5 according to the first to third embodiments.

Example of Hardware Configuration

Figure 15:
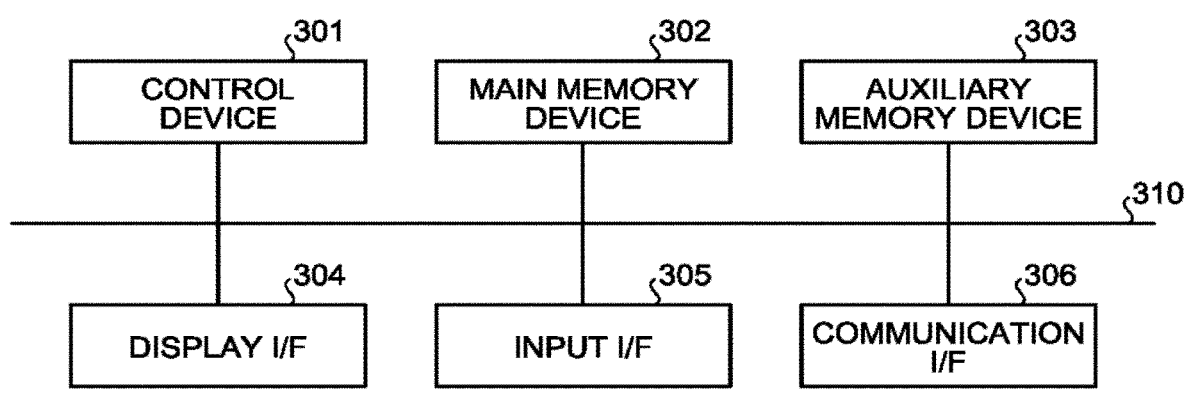
FIG. 15 is a diagram illustrating an exemplary hardware configuration of the communication device and a transfer control device according to the first to third embodiments.

FIG. 15 is a diagram illustrating an exemplary hardware configuration of the communication device 10 and the transfer control device 5 according to the first to third embodiments. The communication device 10 and the transfer control device 5 according to the first to third embodiments include a control device 301, a main memory device 302, an auxiliary memory device 303, a display interface (I/F) 304, an input I/F 305, and a communication I/F 306. Moreover, the main memory device 302, the auxiliary memory device 303, the display interface 304, the input I/F 305, and the communication I/F 306 are connected to each other via a bus 310.

Meanwhile, the communication device 10 and the transfer control device 5 can be implemented either using identical hardware or using different hardware. When the communication device 10 and the transfer control device 5 are implemented using different hardware; for example, the transfer control device 5 can be installed as an add-on device of the communication device 10 at the time of manufacturing the communication device 10. Alternatively, the transfer control device 5 can be installed as an extended module that is connected as an optional module to an extension slot of the communication device 10.

The control device 301 executes a computer program that is read from the auxiliary memory device 303 into the main memory device 302. Examples of the main memory device 302 include a read only memory (ROM) and a random access memory (RAM). Examples of the auxiliary memory device 303 include a hard disk drive (HDD) and a memory card.

The display I/F 304 is an interface for establishing connection with a display device that displays the state of the communication device 10 and the transfer control device 5. Examples of the display device include a liquid crystal display.

The input I/F 305 is an interface for establishing connection with an input device meant for operating the communication device 10 and the transfer control device 5. Examples of the input device include a keyboard and a mouse.

The communication I/F 306 is an interface for performing communication with external devices.

The computer program executed in the communication device 10 and the transfer control device 5 according to the first to third embodiments is recorded as an installable file or an executable file in a computer-readable memory medium such as a compact disc read only memory (CD-ROM), a memory card, a compact disc recordable (CD-R), or a digital versatile disc (DVD); and is provided as a computer program product.

Alternatively, the computer program executed in the communication device 10 and the transfer control device 5 according to the first to third embodiments can be stored in a downloadable manner in a computer connected to a network such as the Internet. Still alternatively, the computer program executed in the communication device 10 and the transfer control device 5 according to the first to third embodiments can be distributed over a network such as the Internet in a non-downloadable manner.

Still alternatively, the computer program executed in the communication device 10 and the transfer control device 5 according to the first to third embodiments can be stored in advance in a ROM.

The computer program executed in the communication device 10 and the transfer control device 5 according to the first to third embodiments contains modules of the functional blocks that, from among the functional blocks of the communication device 10 and the transfer control device 5, can be implemented using the computer program. As the actual hardware, the control device 301 reads the computer program from the memory medium and executes it, so that functional blocks are loaded in the main memory device 302. That is, the functional blocks are generated in the main memory device 302.

Meanwhile, some or all of the functional blocks can be implemented not using software but using hardware such as an integrated circuit (IC).

Moreover, in the case of implementing the functions using a plurality of processors, each processor either can implement a single function or can implement two or more functions.

Furthermore, the communication device 10 and the transfer control device 5 according to the first to third embodiments can have an arbitrary operation mode. For example, the communication device 10 and the transfer control device 5 according to the first to third embodiments can be operated as devices constituting a cloud system in a network.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A transfer control device that controls transferring of data stored in a communication device, the transfer control device comprising:

a memory; and one or more hardware processors electrically coupled to the memory and configured to function as:

a control unit that performs control for transferring the data to a first transmission buffer; and a determining unit that determines, depending on a state of the communication device, data to be restricted from being transferred, wherein when transferring is to be restricted, the control unit delays transferring of the data to be restricted from being transferred, and when an access load of at least one of a memory unit being a source of transferring, the first transmission buffer, and a bus that connects the memory unit and the first transmission buffer is higher than an access threshold value, the determining unit determines that data having a smaller degree of priority than a priority threshold value is to be restricted from being transferred.

2. The transfer control device according to claim 1, wherein when a number of pieces of data stored in the first transmission buffer and having degree of priority to be equal to or greater than the priority threshold value is smaller than a data number threshold value, the determining unit determines that the data having the smaller degree of priority than the priority threshold value is to be restricted from being transferred, and when the number of pieces of data stored in the first transmission buffer and having the degree of priority equal to or greater than the priority threshold value is equal to or greater than the data number threshold value, the determining unit decides that the data having the degree of priority smaller than the priority threshold value is not to be restricted from being transferred.

3. The transfer control device according to claim 1, wherein when a size of data stored in the first transmission buffer and having degree of priority equal to or greater than the priority threshold value is smaller than a data size threshold value, the determining unit determines that the data having the smaller degree of priority than the priority threshold value is to be restricted from being transferred, and when the size of data stored in the first transmission buffer and having the degree of priority equal to or greater than the priority threshold value is equal to or greater than the data size threshold value, the determining unit determines that the data having the degree of priority smaller than the priority threshold value is not to be restricted from being transferred.

4. The transfer control device according to claim 1, wherein according to scheduling information indicating a schedule of transmission timings of data stored in the first transmission buffer and data stored in a second transmission buffer, the determining unit determines data to be restricted from being transferred, and the control unit performs control so that data having a degree of priority equal to or greater than the priority threshold value is promptly transferred to the first transmission buffer, and when transferring is not restricted, the data having the degree of priority smaller than the priority threshold value is promptly transferred to the second transmission buffer.

5. The transfer control device according to claim 4, wherein the determining unit refers to the scheduling information, calculates a number of pieces of data that are transmittable from the first transmission buffer at next transmission timing, and when a number of pieces of data stored in the first transmission buffer is smaller than the number of transmittable pieces of data, pieces of the data having the degree of priority smaller than the priority threshold value is to be restricted from being transferred, and when the data having the degree of priority smaller than the priority threshold value is to be restricted from being transferred, the control unit delays transferring of the data having the degree of priority smaller than the priority threshold value.

6. The transfer control device according to claim 4, wherein the scheduling information represents a gate control list of IEEE 802.1Qbv standard.

7. A transfer control method implemented in a transfer control device that controls transferring of data stored in a communication device, the transmission control method comprising:

performing control for transferring the data to a first transmission buffer;

determining, depending on a state of the communication device, data to be restricted from being transferred;

delaying transferring of the data to be restricted;

determining that an access load of at least one of a memory unit being a source of transferring, the first transmission buffer, and a bus that connects the memory unit and the first transmission buffer is higher than an access threshold value; and determining whether or not data having a smaller degree of priority than a priority threshold value is to be restricted from being transferred.

8. A computer program product having a non-transitory computer readable medium including programmed instructions, wherein the instructions, when executed by a computer that controls transferring of data stored in a communication device, cause the computer to function as:

a control unit that performs control for transferring the data to a first transmission buffer; and a determining unit that, depending on state of the communication device, determines data to be restricted from being transferred, wherein when transferring is to be restricted, the control unit delays transferring of the data to be restricted from being transferred, and when an access load of at least one of a memory unit being a source of transferring, the first transmission buffer, and a bus that connects the memory unit and the first transmission buffer is higher than an access threshold value, the determining unit determines that data having a smaller degree of priority than a priority threshold value is to be restricted from being transferred.

* * * * *